R. C. BARFIELD.
AUTOMOBILE SIGNAL.
APPLICATION FILED MAR. 20, 1917.
1,277,175.
Patented Aug. 27, 1918.
2 SHEETS—SHEET 1.
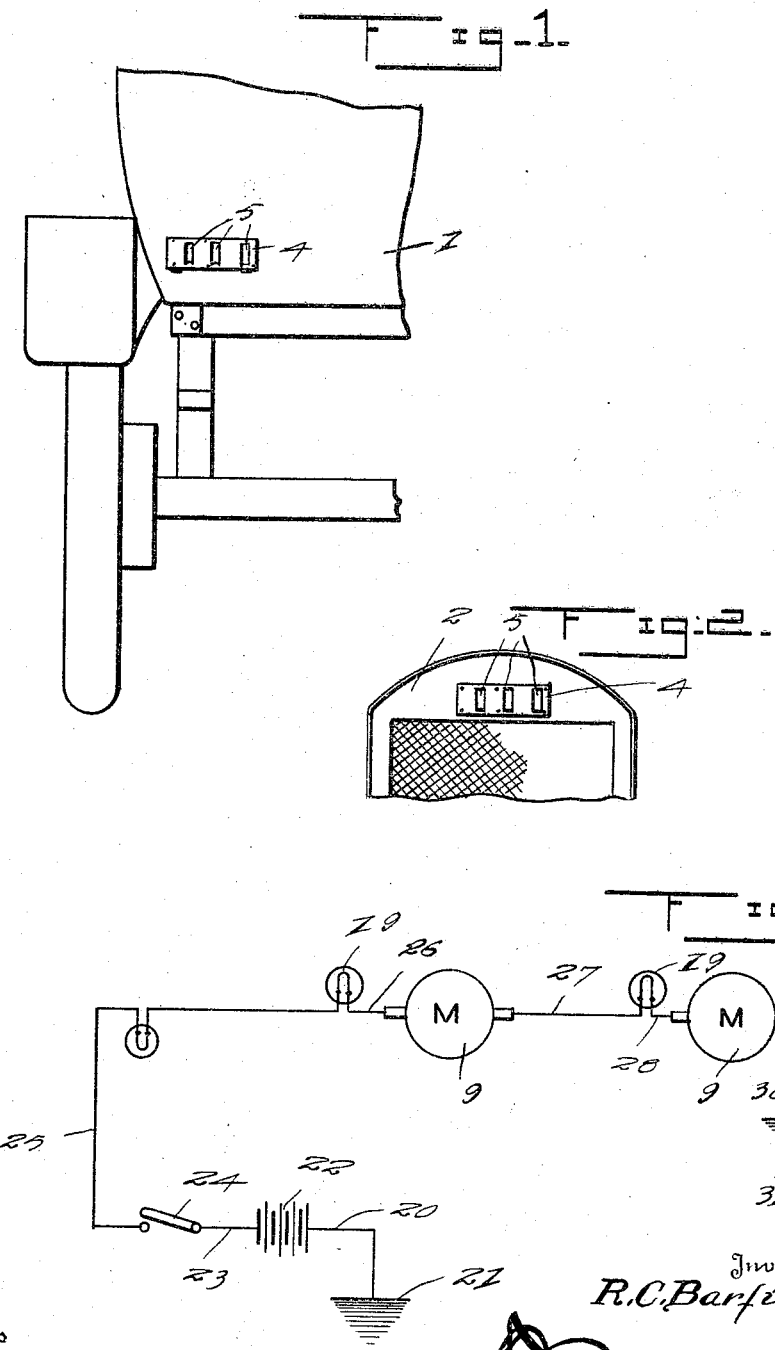

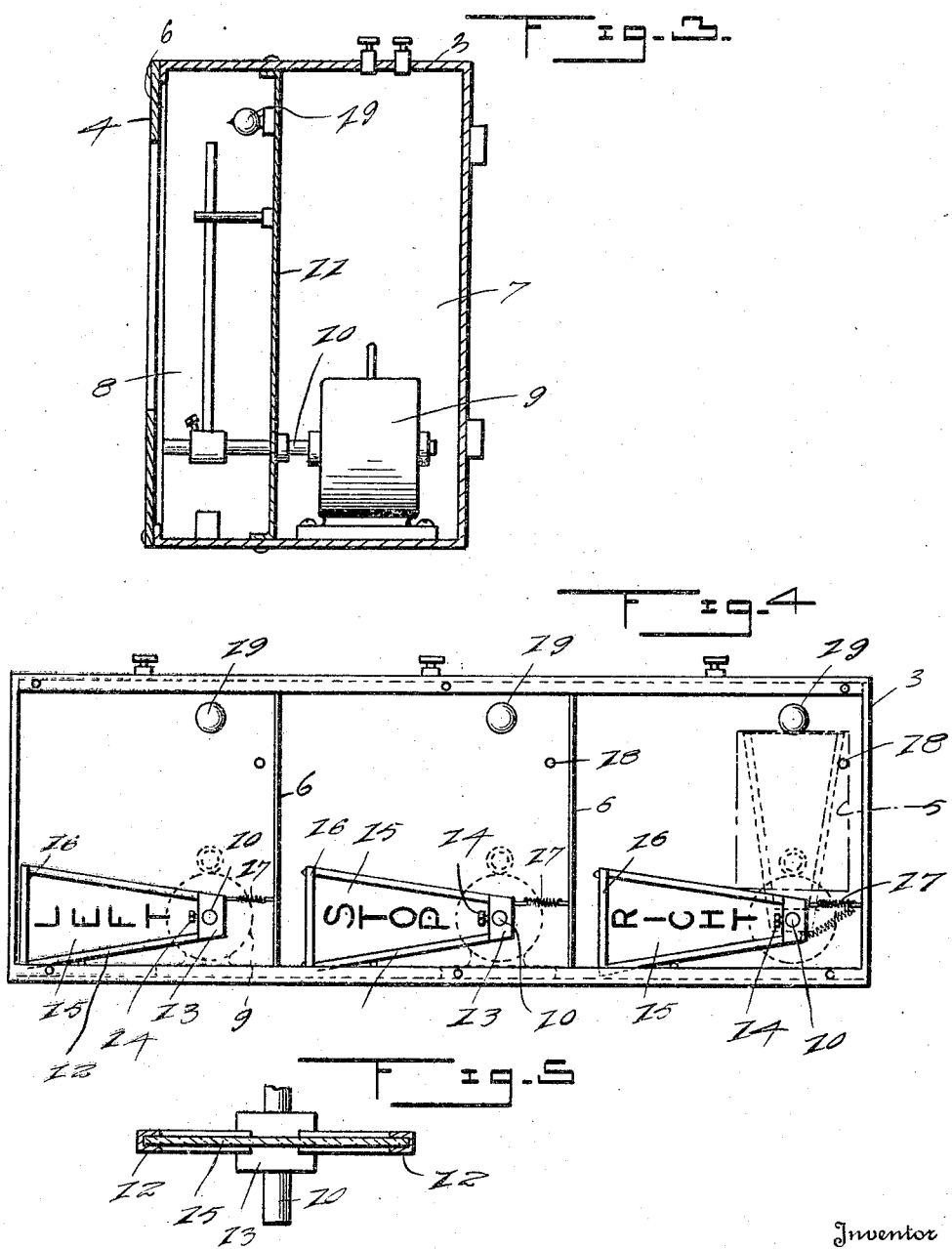

UNITED STATES PATENT OFFICE.

ROBERT C. BARFIELD, OF SALEM, OREGON.

AUTOMOBILE-SIGNAL.

1,277,175.

Specification of Letters Patent.   Patented Aug. 27, 1918.

Application filed March 20, 1917.   Serial No. 156,092.

*To all whom it may concern:*

Be it known that I, ROBERT C. BARFIELD, a citizen of the United States, residing at Salem, in the county of Marion and State of Oregon, have invented certain new and useful Improvements in Automobile-Signals; and I do hereby declare the following to be a full, clear, and exact description of the invention, such as will enable others skilled in the art to which it appertains to make and use the same.

This invention relates to an automobile signal and has for one of its objects the provision of a device of this character, whereby the operator of the automobile may readily notify the traffic in front and rear of the automobile in which direction a turn is contemplated or if a stop is contemplated.

Another object of this invention is the provision of casings secured to the front and rear of the automobile and having semaphore arms therein each carrying direction indicating characters and which are adapted to be moved into signaling position by the operator, when desiring to notify the traffic in which direction a turn is contemplated.

A further object of this invention is the provision of electrical means located within the casing and operatively connected with the semaphore arms which are adapted to swing the semaphore arms into signaling position when an electric circuit is completed to said electrical means by the operator.

A further object of this invention is the provision of means for returning the semaphore arms to non-signaling position.

A still further object of this invention is the provision of an automobile signal of the above stated character, which shall be simple, durable and efficient and which may be manufactured and sold at a comparatively low cost.

With these and other objects in view as will become more apparent as the description proceeds, the invention consists of certain novel features of construction, combination and arrangement of parts as will be hereinafter more fully described and claimed.

For a complete understanding of my invention, reference may be had to the following description and accompanying drawings, in which:

Figure 1 is a fragmentary rear elevation of an automobile, illustrating my invention applied thereto, Fig. 2 is a fragmentary front elevation of an automobile, illustrating my invention applied thereto, Fig. 3 is a transverse sectional view illustrating one of the semaphore arms in signaling position, Fig. 4 is a front elevation of one of the casings, illustrating the semaphore arms in a non-signaling position, Fig. 5 is a detail sectional view illustrating the means for securing the plates to the frame of the semaphore arms, Fig. 6 is a diagrammatical view illustrating the wiring diagram.

Referring in detail to the drawings, the numeral 1 indicates the rear portion of an automobile and 2 represents the forward portion or the radiator. In applying my invention to automobiles, a signal is secured to the front and rear of the automobile, as illustrated in Figs. 1 and 2, and each are adapted to operate simultaneously or when a certain signal is given upon the front of the automobile, a corresponding signal will be given at the rear thereof, whereby the traffic in front and rear of the automobile will be notified. As the signals located on the front and rear of the automobile are identical in construction, it is thought that reference to one will be sufficient for both.

A substantially rectangular casing 3 has a removable front wall 4 which is provided with a plurality of openings 5. The casing 3 is divided into three compartments, by transverse partitions 6 as clearly illustrated in Fig. 4, and each compartment is divided in a pair of chambers; the numeral 7 representing a motor chamber and the numeral 8 representing a signal chamber. Each of the motor chambers has a motor 9 mounted therein which has a shaft 10 which extends through the partitions 11 that form the motor and signal chambers and have their free ends disposed within the signal chambers.

Substantially V-shaped frames 12 having the arm portions constructed of channel iron as illustrated at Fig. 5, and their web portions formed by plates 13, which are provided with apertures to receive the ends of the shafts 10 of the motors 9 and are held thereon by set screws 14. Transparent plates 15 are slidable in the arm portions of the frames and are held therein by end strips 16, which are secured to the ends of the arm portions by suitable fasteners providing means whereby the plates may be readily removed whenever desired. The plates have applied thereto in any suitable manner, certain direction indicating characters, such as "Right," "Stop" and "Left," as illustrated in Fig. 4. Coiled springs 17 are secured to the plates 13 forming a portion of the frames 12 and are secured to the transverse partitions 6 for normally holding the frames in substantially horizontal position. When the frames have the plates bearing the direction indicating characters applied thereto, they form efficient semaphore arms; when the semaphore arms are in a horizontal position, as illustrated in Fig. 4, they are hidden from view and occupy a position known as a non-signaling position. By closing electric circuits to the motors 9, they will rotate said motors, swinging the semaphore arms into a vertical position and a position rearward of the openings 5, so that direction indicating characters thereon will be visible to the traffic. The semaphore arms are limited in their upward movement by stops 18 secured to the partitions 11. Each of the signal chambers 8 have an electric lamp 19 mounted therein and adapted to be illuminated when the semaphore arms are swung into signaling position or a vertical position in view through the openings of the casing 3, so that the device may be visible at night time. After the semaphore arms have been swung to a signaling position, they are returned to a non-signaling position or a horizontal position under the influence of the springs 17.

The motors mounted in the front casing or the casing, which is secured to the front of the automobile, are electrically connected to the corresponding motors in the rear casing or the casing which is mounted upon the rear of the automobile, each by a separate circuit as illustrated in Fig. 5 and the corresponding motors of each of the casings are adapted to be controlled by separate push buttons, which are mounted upon the steering wheel or similar place of the automobile. Each of the circuits consists of a conductor 20 connected to a ground 21 and to a battery 22. A conductor 23 is connected to the battery 22 and to the switch 24, which is one of the switches located upon the steering wheel or similar place. Connected to the switch 24 is a conductor 25, which is connected to one of the electric lamps 19, located in one of the signal chambers 8 of one of the casings and has connected thereto a conductor 26, which is connected to the corresponding motor 9. Connected to the motor 9 is a conductor 27, which is connected to the electric lamp 19 located in the other casing and which is connected to a corresponding motor 9 by a conductor 28. Connected to the last mentioned motor 9 is a conductor 30, which is connected to the ground 31, whereby upon closing the switch 24, an electric circuit is made to the electric lamps 19 and to motors for swinging the semaphore arms connected to the motor into signaling position in each of the casings simultaneously and for illuminating the electric lamps 19.

What is claimed is:

An automobile signal comprising a casing having a plurality of compartments provided with openings in the front wall thereof, motors in said casing, substantially U-shaped frames secured to the shafts of the motors and constructed of channel iron, transparent panels carried by said frames and each bearing different direction characters, strips secured to the ends of the arm portions of the frames for retaining the panels therein, springs connected to the web portions of the frames and to the casing for normally holding said frames in an inoperative position, stops carried by said casing for engaging the frames when swung to signaling position to aline the panels with the openings in the compartments, and means energizing the motors.

In testimony whereof I affix my signature in presence of two witnesses.

ROBERT C. BARFIELD.

Witnesses:
AGNES C. BAYNE,
JOHN BAYNE.

Copies of this patent may be obtained for five cents each, by addressing the "Commissioner of Patents, Washington, D. C."